June 3, 1952   J. H. FRIEDMAN   2,599,053
COLD HEADER
Filed May 15, 1946   12 Sheets-Sheet 3
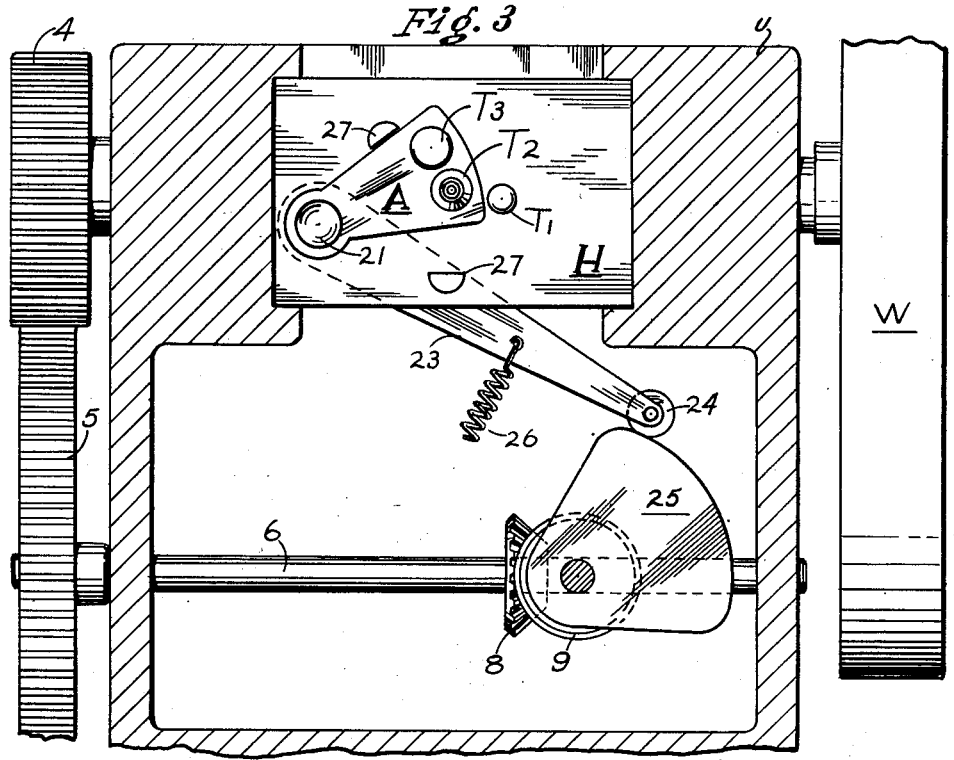
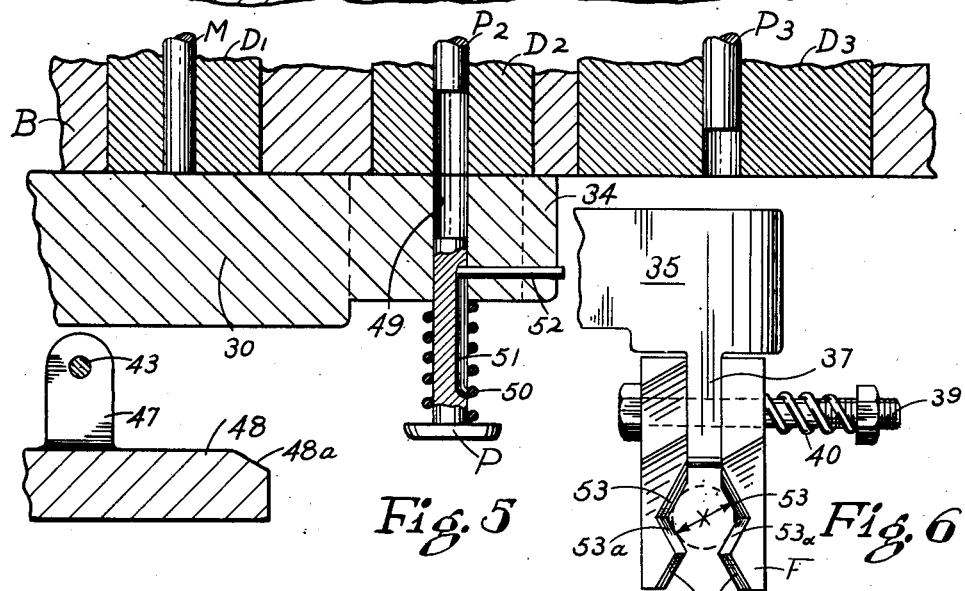
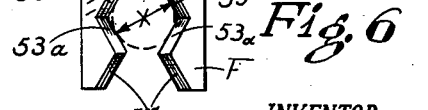
INVENTOR.
JOHN H. FRIEDMAN
BY
ATTORNEYS

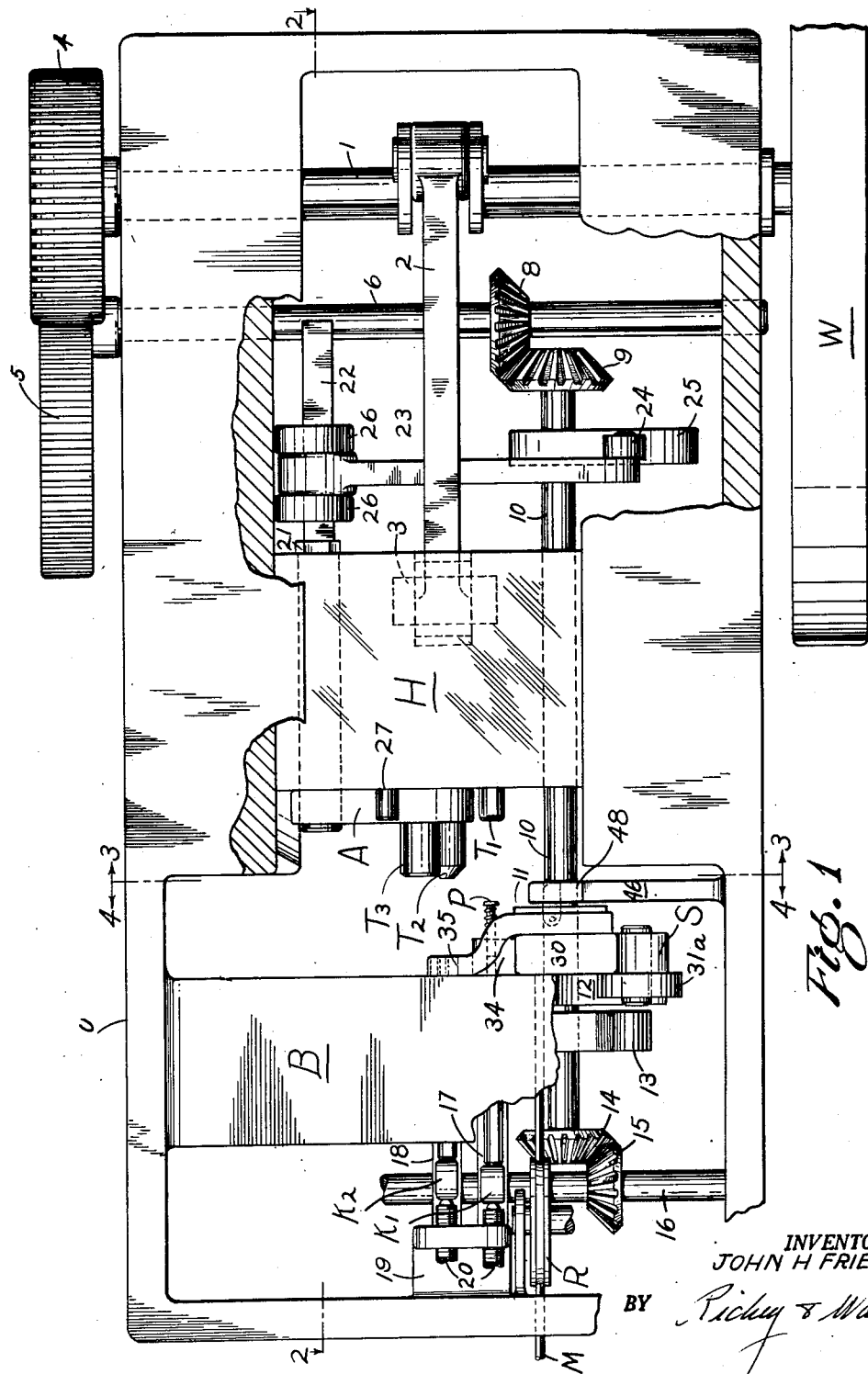

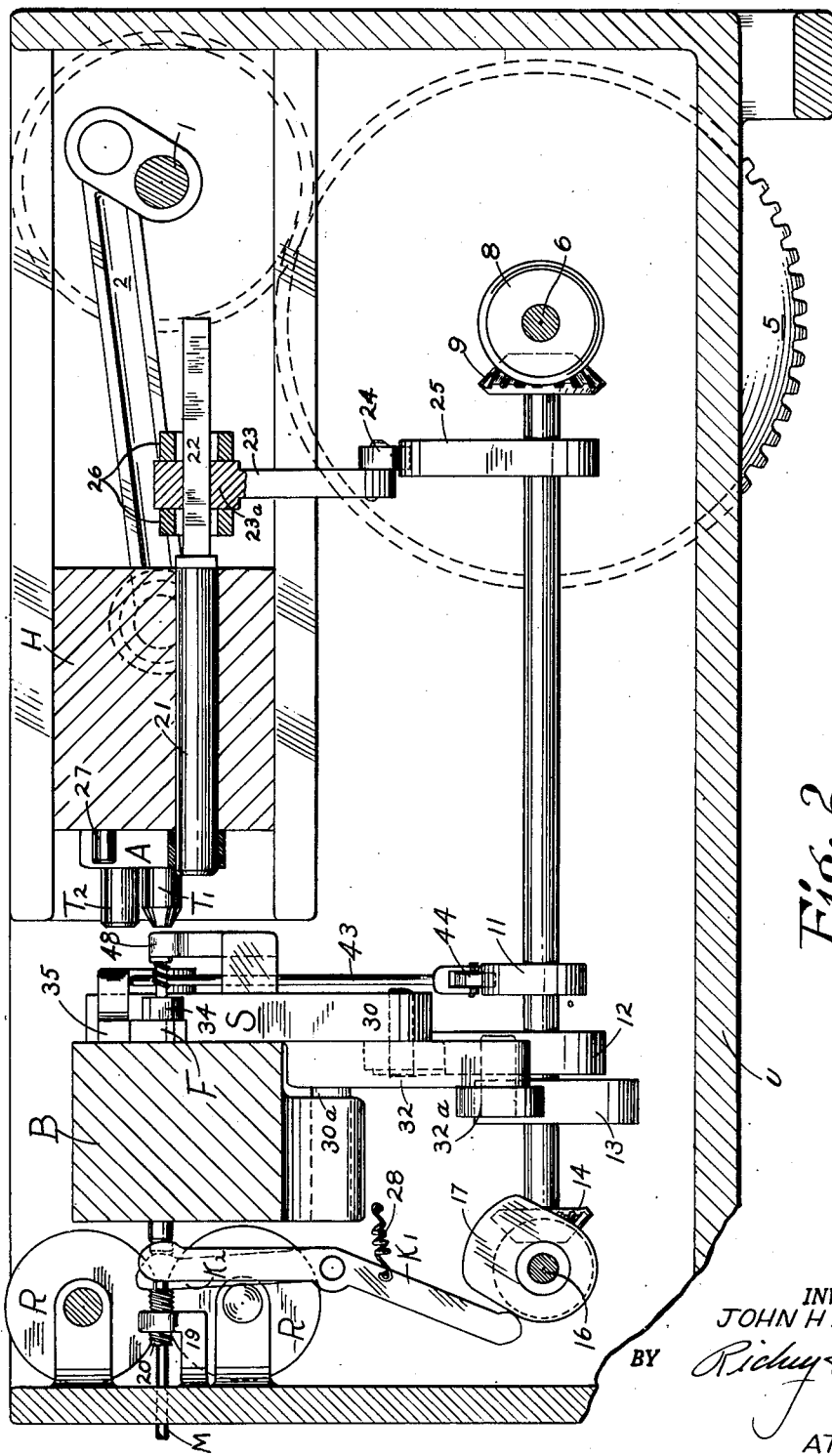

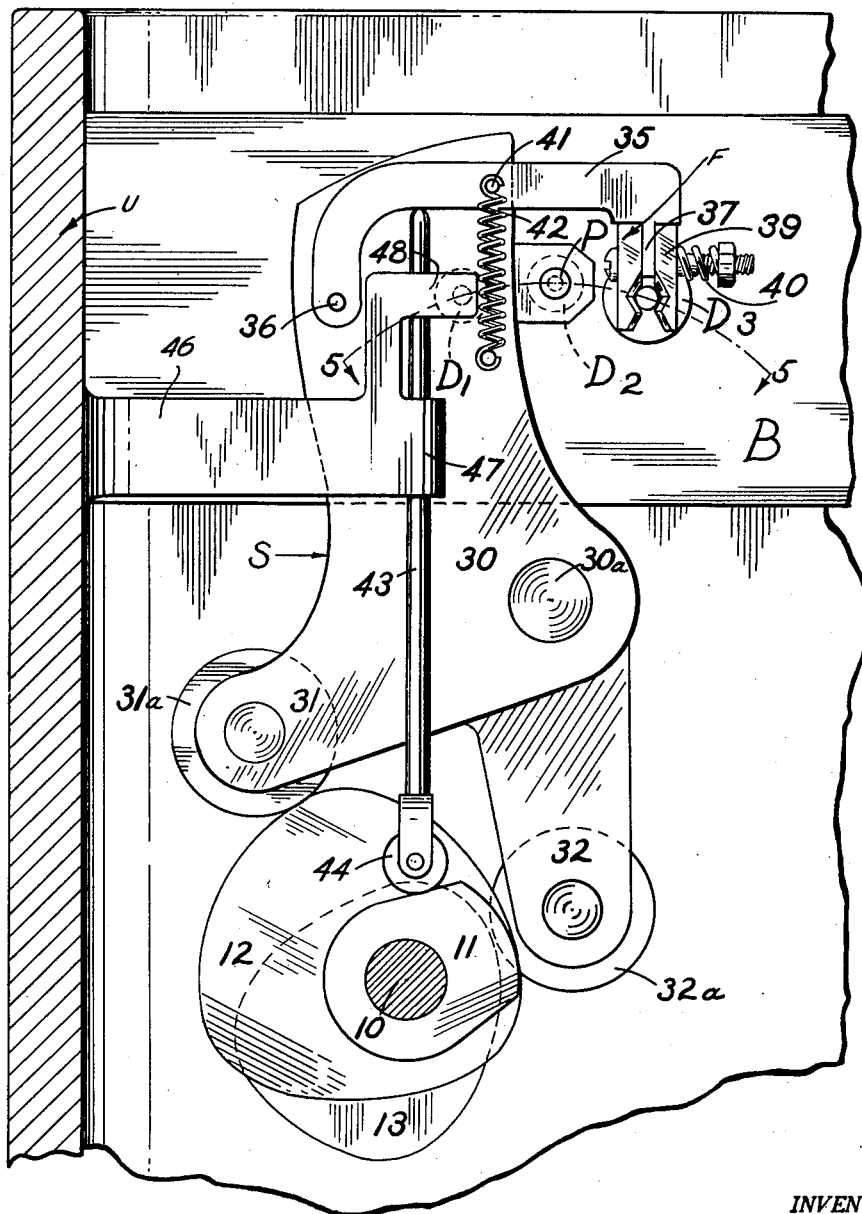

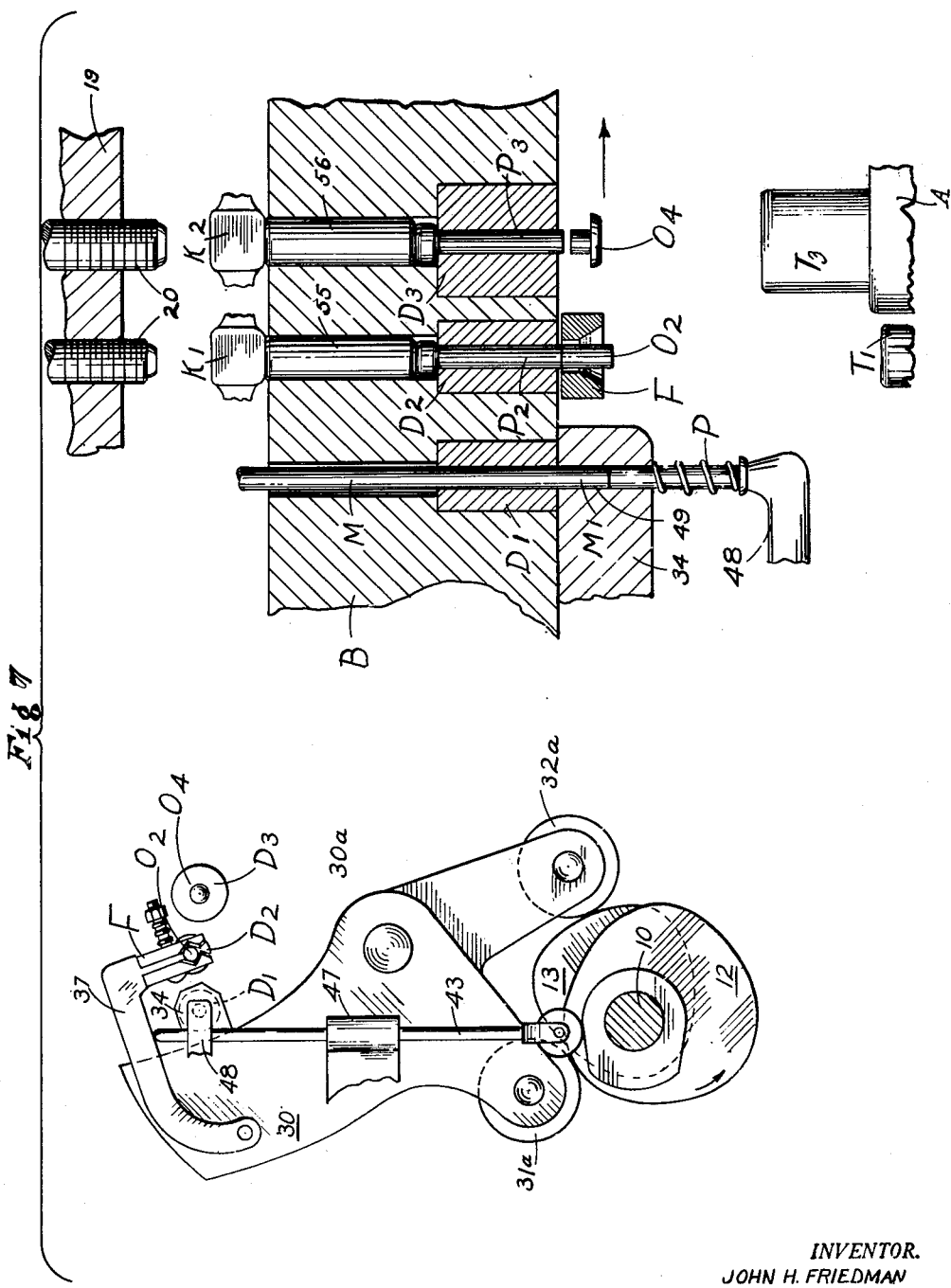

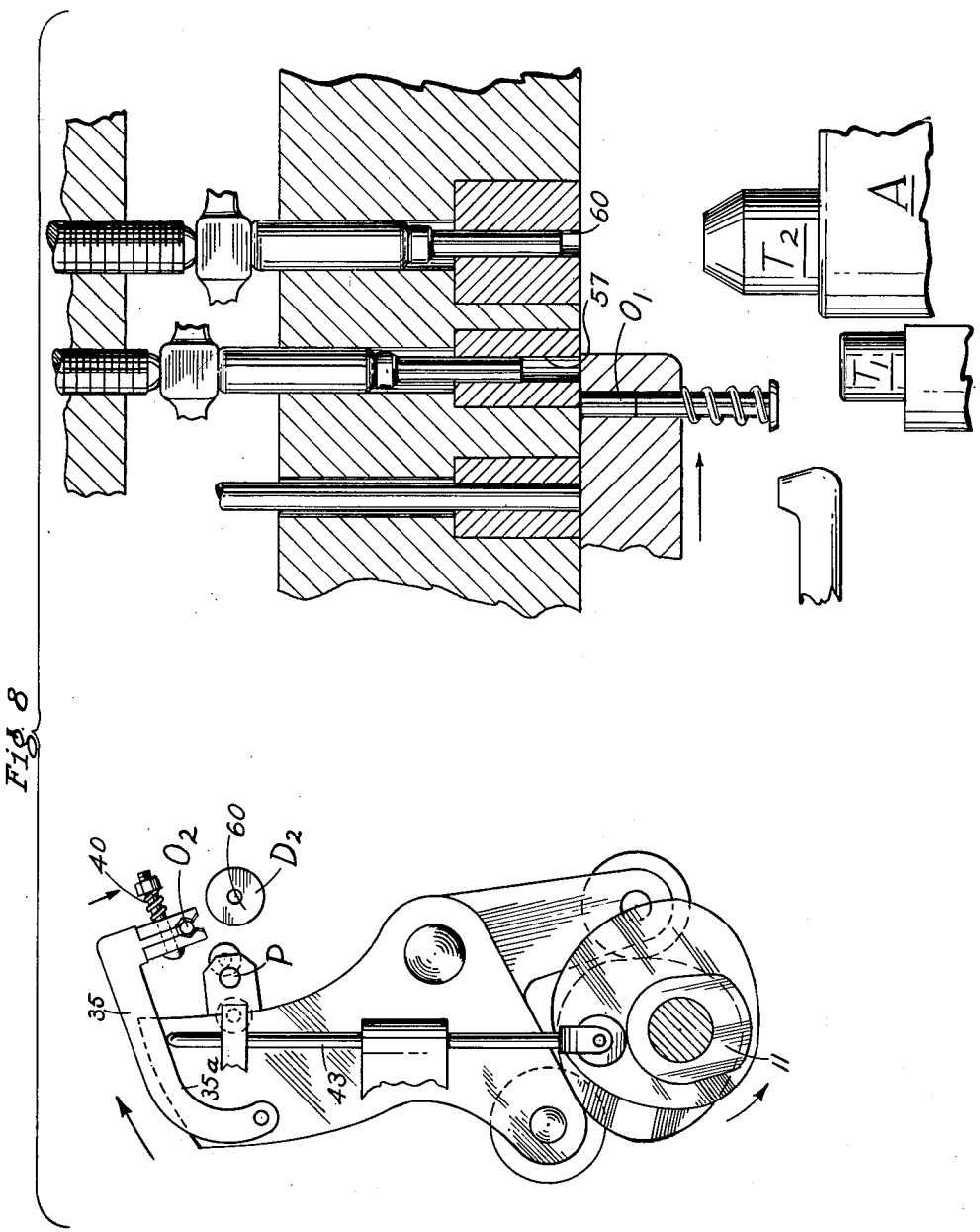

June 3, 1952 J. H. FRIEDMAN 2,599,053
COLD HEADER
Filed May 15, 1946 12 Sheets-Sheet 7
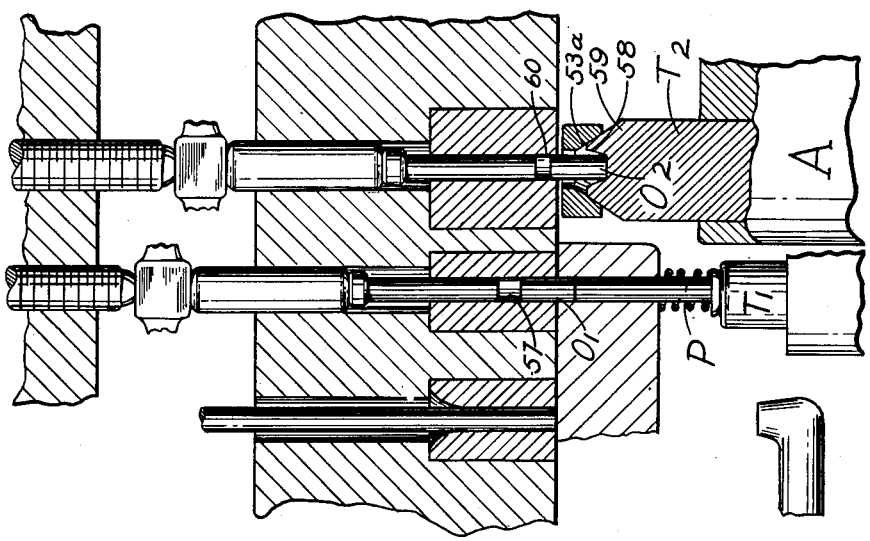
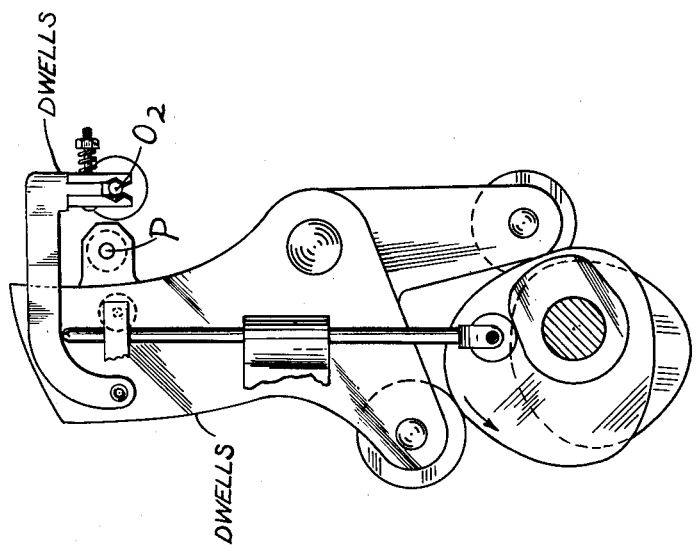
Fig. 9
INVENTOR.
JOHN H FRIEDMAN
BY
ATTORNEYS June 3, 1952  J. H. FRIEDMAN  2,599,053
COLD HEADER Filed May 15, 1946  12 Sheets-Sheet 8

INVENTOR.
JOHN H. FRIEDMAN
BY
ATTORNEYS

June 3, 1952  J. H. FRIEDMAN  2,599,053
COLD HEADER

Filed May 15, 1946  12 Sheets-Sheet 9

INVENTOR.
JOHN H. FRIEDMAN
BY
ATTORNEYS

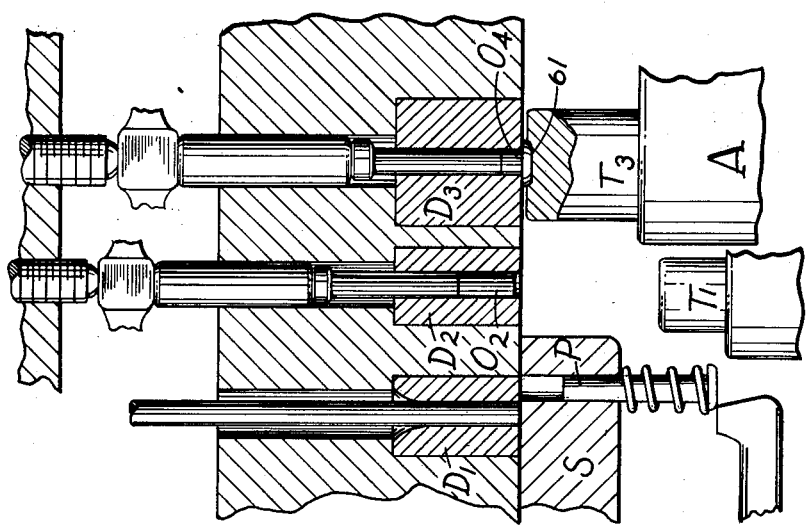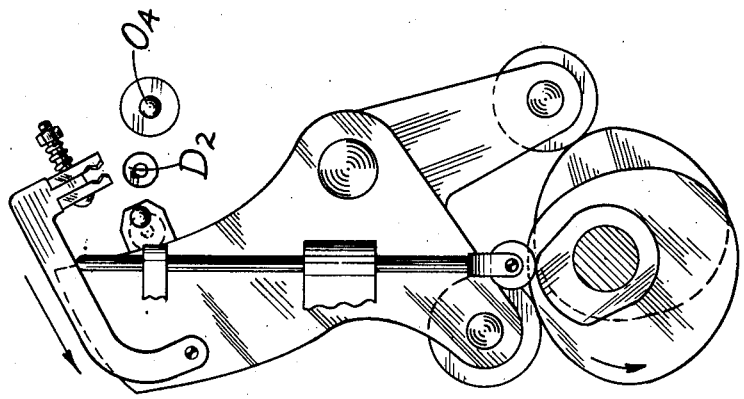
Fig 12

INVENTOR.
JOHN H. FRIEDMAN
BY
ATTORNEYS

Patented June 3, 1952

2,599,053

UNITED STATES PATENT OFFICE 2,599,053

COLD HEADER

John H. Friedman, Tiffin, Ohio, assignor to The National Machinery Company, Tiffin, Ohio, a corporation of Ohio Application May 15, 1946, Serial No. 669,940

4 Claims. (Cl. 10—11)

This invention relates to metal working machines, more specifically to forging or heading machines sometimes referred to in the art as double blow headers.

Generally speaking, a double blow header of the type to which this invention relates includes a die block through which stock is fed by intermittently driven feed rollers, timed shearing mechanism whereby a blank is sheared off, transfer mechanism whereby the blank is positioned in front of a forming die, and a header slide carrying forming tools whereby the blank is given two heading blows before the next shearing cycle takes place. The header slide is reciprocated in the usual manner and usually includes two heading tools mounted on a shifting mechanism which alternately presents the tools to the blank. In a double blow header, the arrangement is such that the header slide makes two strokes to one stroke of the shear and transfer mechanism thereby providing the so-called double blow arrangement.

In the machines of this type which have been used before my invention, it was customary to provide in the die block a shearing die which received the rod or wire stock and which was traversed by the shearing mechanism to shear off the blank. A forming die was also provided in front of which the blank was positioned and in which it received the double blow forming operations. Prior art shearing mechanisms have been designed so that the movable portion of the shear which shears the blank contains a solid shearing portion having a blank receiving notch, usually semi-cylindrical, and a mechanically operated finger to retain the blank in the shear notch after the shearing portion has done its work.

After the blank was sheared off and positioned in front of the die, the first heading operation initially caused the blank to be forced into the die with which the solid portion of the shear must be rapidly retracted to permit the heading tool to continue on its heading stroke.

Such arrangements in the prior art have been proven in practice to offer several serious disadvantages. In the first place, the use of an open bodied shear has resulted in the formation of irregularly shaped sheared blanks. It is an object of my invention to provide relatively regular and uniformly formed sheared blanks by the use of a so-called solid shear in which the stock is fed into a completely enclosed aperture in the shear. Although a solid shear of this type has been known in the art, for reasons which will appear as this specification proceeds, prior workers in this field have been unable to adapt the use of a solid shear to a simple double blow header such as that to which this invention relates.

Another disadvantage of the open shear and finger arrangement found in the prior art stems from the fact that timing of the motion at the instant the first tool strikes the shear blank and starts to force it into the die, must be very accurate and must be maintained accurately, otherwise either one of two undesirable things will occur. Either the shear and transfer mechanism will open and retract before the tool catches the blank in the die, or the shear might dwell in front of the die just long enough for the tool to strike and damage the solid portion thereof. It is an object of this invention to provide a shear and transfer mechanism in which the solid portion of the shear is at a dwell or rest period during the first blow so that there is little danger of damage thereto, and likewise it is an object to provide a transfer mechanism on the shear which is such that slight errors in its motion or position will not result in damage to the mechanism.

According to well-known principles of machine design, in machines which perform metal forging operations such as those carried out here the rigidity of the various parts of the machine is a highly important factor both in accuracy of the product and in the life of the machine. Of course, rigidity can be obtained by either of two methods, namely, that of increasing the weight and size of the parts to withstand a given bending moment thereon, or to dispose the parts relatively close together, thereby decreasing the loads and bending moments, thereby bringing the size of the machine to a minimum. Those skilled in this art have not been unaware of these problems and have made every attempt to dispose the dies as close together as possible, thereby reducing the loads on the machine and permitting better all around machine design.

According to the principles outlined above, the die which receives the stock and the forming die have been placed as close together as possible consistent with the provision of proper clearance between the shear and transfer mechanism and the header slide and tools, during the heading blows. This has meant, however, that the shear must travel the full distance between the two dies, which, coupled with the accurate timing necessary at some parts of the cycle has resulted in the need for very accurate driving cams or other mechanism and rapid acceleration and deceleration of the shearing mechanism, all of which contribute to the wear of the machine. It is an object of this invention to reduce wear and impact on the shearing mechanism by cutting the shear travel to half that found on similar machines currently being manufactured. Briefly, this is accomplished by providing an intermediate transfer station between the die which receives the stock and the forming die. With this arrangement the shear need only move the blank to the transfer station, a distance half that formerly covered. Likewise, a transfer finger arrangement is provided on the shear which transfers the blank from the transfer station to the forming die, the net result being that the shear motion is halved.

As mentioned above, in the prior art the sheared blank tended to be non-uniform and erratic in size. This is true, although to a reduced degree, when a solid shear is provided. Accordingly, it is a further object of this invention to present uniformly sized blanks to the forming die, this result being obtained by taking advantage of the transfer die and performing a preliminary sizing operation on the blank while it is in that die.

These and other objects of my invention will become apparent to those skilled in the art as the following detailed description of a preferred embodiment proceeds:

In the drawings:

Fig. 1 is a plan view of my double header, part of the die block and parts of the frame broken away for clarity;

Fig. 2 is a section through my machine taken on lines 2—2 shown in Fig. 1;

Fig. 3 is a transverse section through my machine taken on the lines 3—3 of Fig. 1 to show the tool shifting mechanism;

Fig. 4 is a transverse section taken on line 4—4 of Fig. 1 to show the shearing mechanism, this figure being an enlarged partial section with parts of the knock-out mechanism removed;

Fig. 5 is a partial section taken through the dies on line 5—5 in Fig. 4 in order to show the detail of how the pin punch carried by the shear is mounted;

Fig. 6 is an enlarged view of the transfer finger mechanism carried by the shear.

The figures which follow, namely, Figs. 7–13 are simplified schematic diagrams serving to illustrate a cycle of the machine. Each of these figures includes two views, the first being a section through the dies similar to Fig. 5 but with the parts represented more schematically and with the position of the knock outs shown schematically, and the second view of each figure being an elevation of the shearing mechanism such as that shown in Fig. 4 with certain parts simplified and design details omitted.

Figure 10:
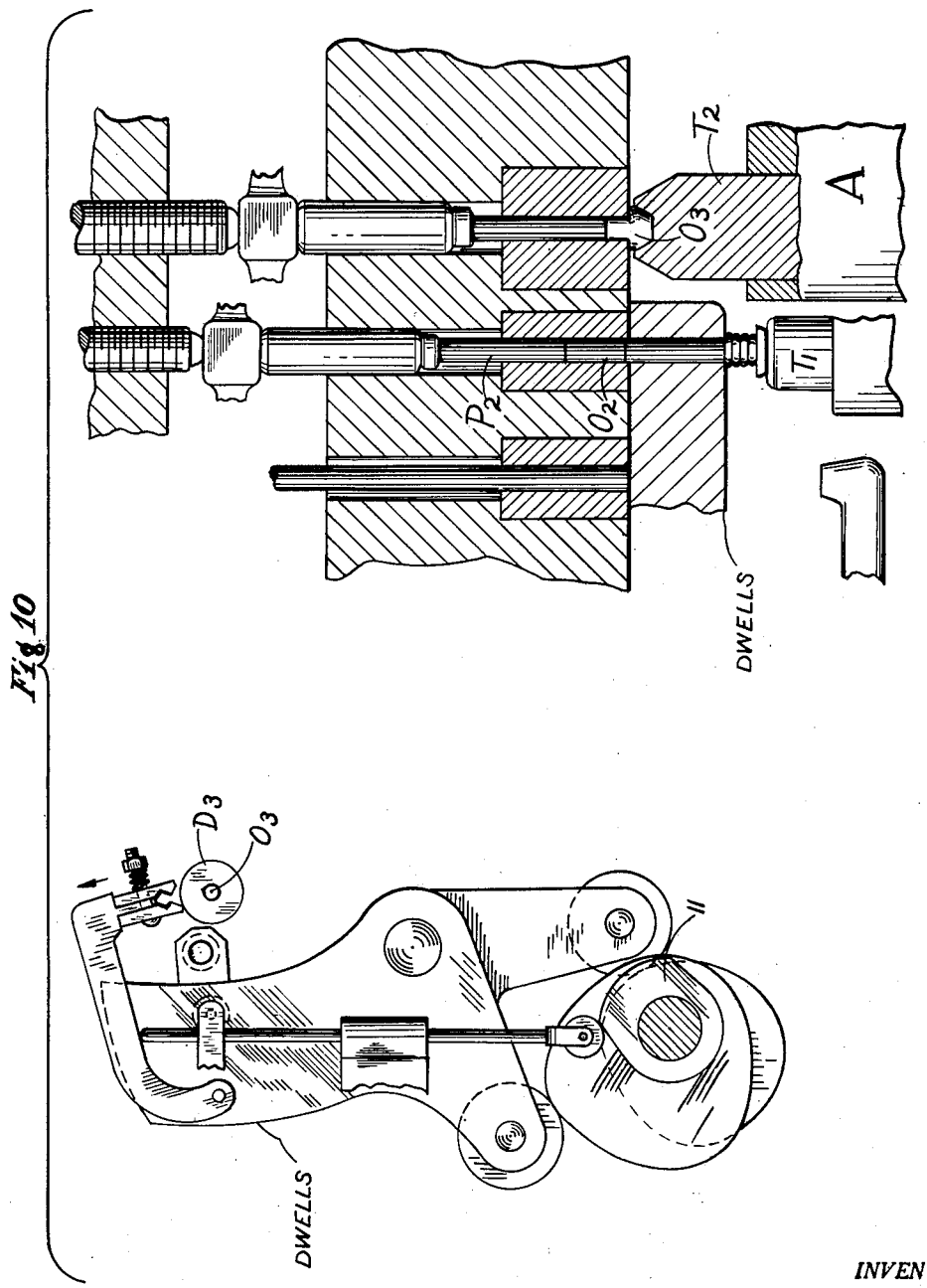
Figure 11:
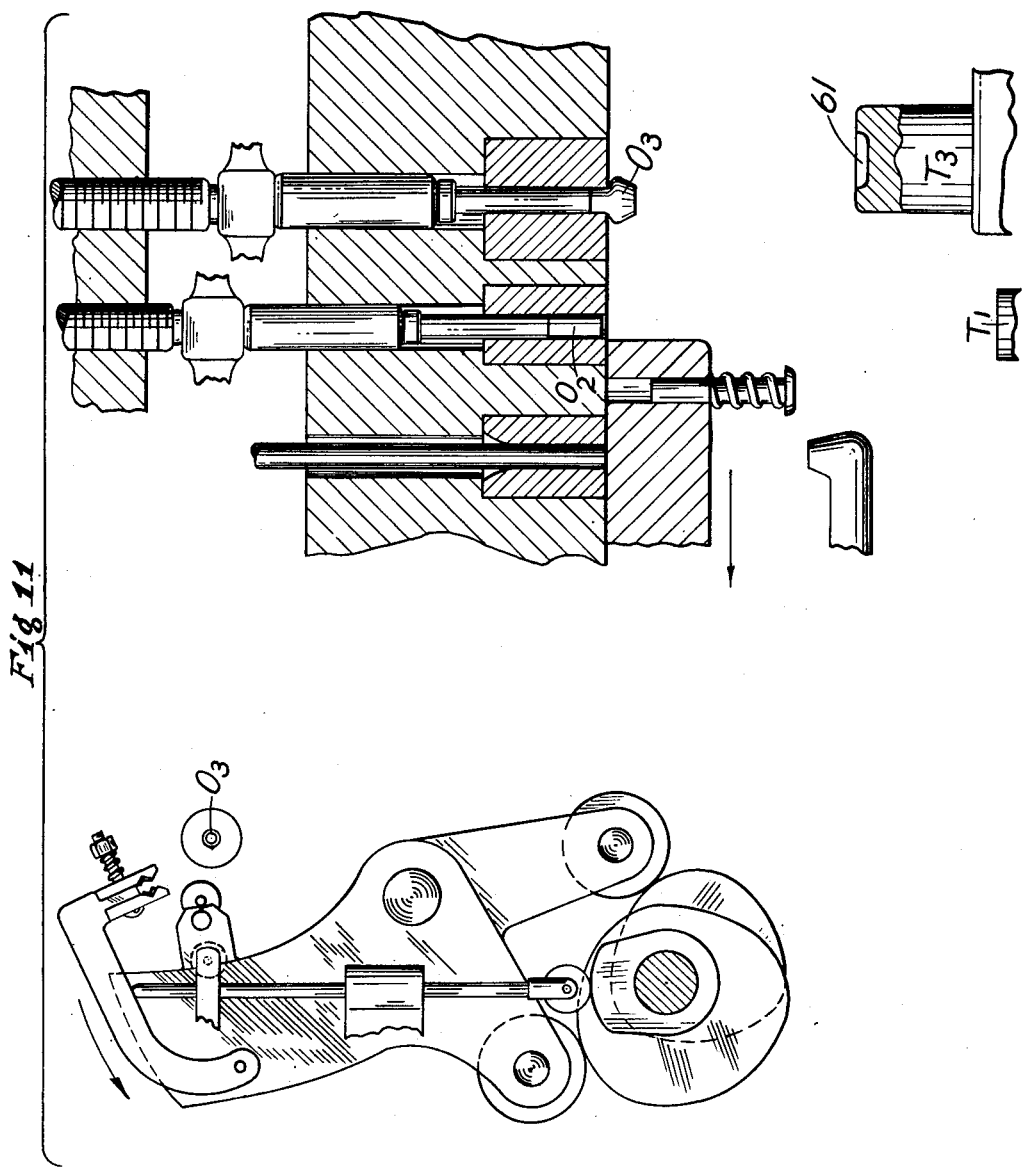
Figure 13:
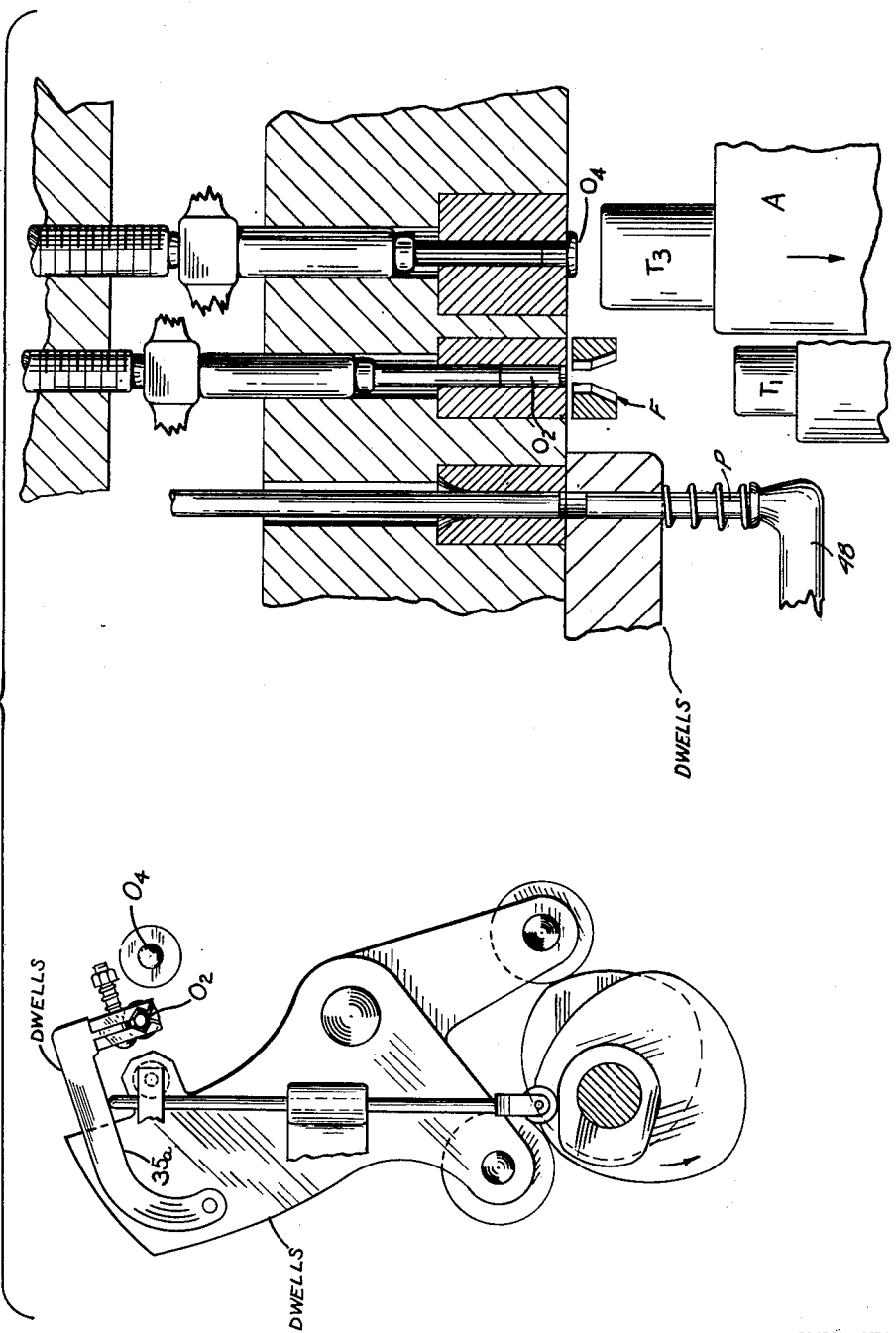

Fig. 7 illustrates the position of the parts during the knock-out and feeding operations;

Fig. 8 shows the positions of the parts at an intermediate portion of the transfer motion;

Fig. 9 shows the positions of the parts just as the first blow starts and as the blank is first caught in the die by the first heading tool;

Fig. 10 shows the completion of the first blow;

Fig. 11 shows the parts in a position in between the first and second blows with the shearing mechanism retracting;

Fig. 12 shows the second blow;

Fig. 13 shows the heading tool beginning to retract after the second blow, the parts dwelling in their previous positions preparatory to knock out and feed, and, of course, the cycle is completed by reference back to Fig. 7 which shows the final part being knocked out.

Figure 14:
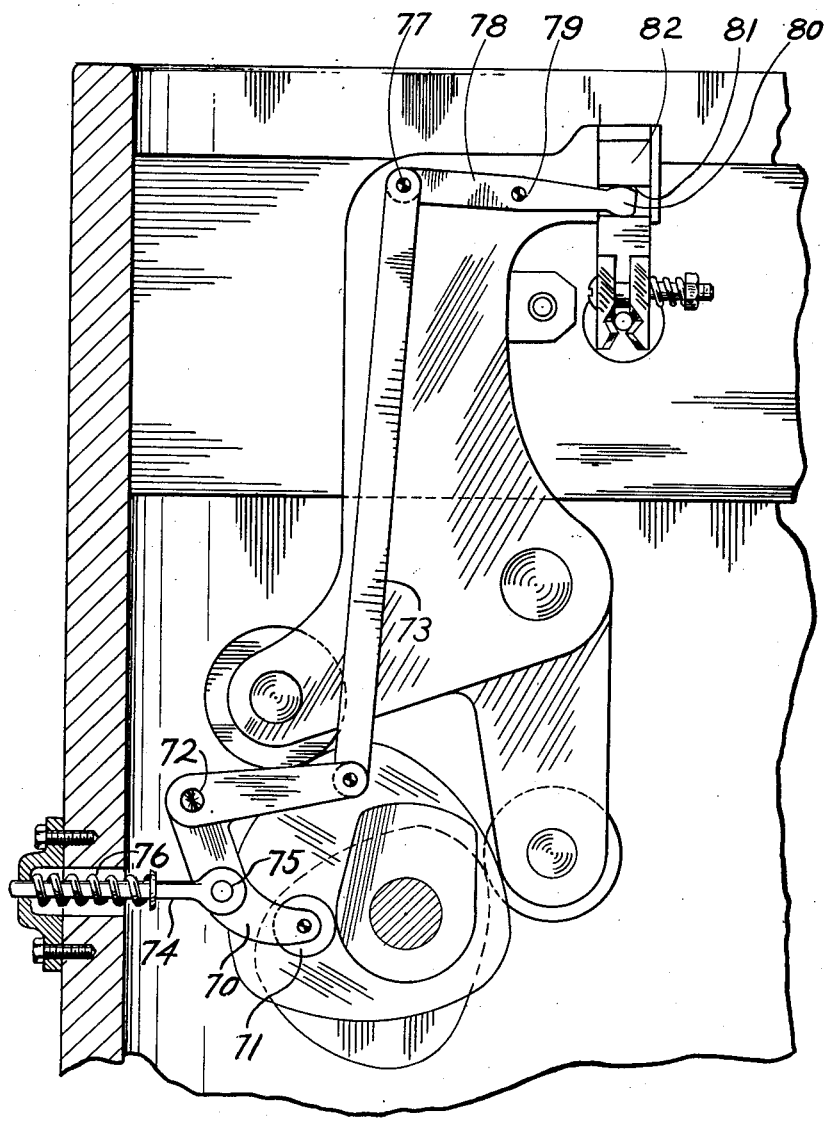

Fig. 14 shows a modified transfer finger actuating mechanism.

Referring now to Fig. 1, the machine is housed and supported in a frame shown generally at U. In accordance with conventional practice in these machines the crank shaft 1 is provided with a crank which reciprocates the connecting rod 2 pivotally connected in any conventional manner at 3 to the header slide in order to reciprocate the heading slide H. The header slide may be mounted in accordance with usual practice in ways or guides which permit its reciprocation. A movable tool supporting arm member A is positioned at the forward portion of the header slide for carrying tools $T_2$ and $T_3$ which perform the heading operations. A hammer tool $T_1$ is mounted solidly on the face of the header slide. The crank shaft 1 may be driven by a fly wheel and pulley arrangement W, and the crank shaft is provided with a driving pinion 4 which meshes with a driving gear 5 mounted on a jack shaft 6, the jack shaft being driven at half crank shaft speed. The jack shaft 6 carries miter gear 8 which meshes with a second miter gear 9 to drive the longitudinal shaft 10. In order that the shearing mechanism and transfer mechanism may be operated, cams 11, 12 and 13 are driven by shaft 10 but these cams appear more clearly in other views and will be referred to in connection thereto. A second pair of miter gears 14 and 15 are also shown in Fig. 1; they are provided to drive a cross shaft 16, in order to drive the knock-out mechanism. Two knock-out cams 17 and 18 are driven by the cross shaft 16; the knock-out arms $K_1$ and $K_2$ appear to better advantage in other views and will be referred to again. An adjusting screw support 19 may be mounted on the frame and it carries adjustable stock screws 20 for the knock-out arms.

Turning now to Fig. 2, the feed rollers which feed the stock M into the first die may be seen. These feed rollers may be driven in intermittent timed relationship to the balance of the machine by an overrunning clutch such as that disclosed in my copending application, Serial No. 644,531, filed January 31, 1946, now Patent No. 2,538,619, and in the patent to W. L. Clouse, No. 1,856,027, the driving mechanism for the feed rollers being driven at half speed with respect to the crank shaft. Likewise, on Fig. 2 the positions of the shear cams 11, 12 and 13 can be seen and one of the knock-out cams 17 which drives the first knock-out arm $K_1$ is clearly visible. The other knock-out cam is disposed behind the cam 17. A portion of the second knock-out arm $K_2$ can be partially seen behind $K_1$. Springs as at 28 may be provided to urge the knock-out arms against their respective cams.

Certain parts of the tool shifting mechanism can be seen clearly on Fig. 2. In a preferred embodiment, a tool supporting arm A may be mounted on a shaft 21 which extends through an aperture on the header slide H. The other end of shaft 21 may carry a square or splined portion 22 which is turned by the shift arm 23. That portion of the shift arm 23 which receives the squared portion 22 is apertured to fit the portion 22 as at 23a. Shift arm 23 may be provided with a cam engaging roller 24 for actuation in proper timed relationship by the tool shifting cam 25, which cam may be driven by longitudinal shaft 10.

Certain parts of the tool shifting mechanism appear to advantage in Fig. 3, wherein the arm A may be seen clearly, together with the tools $T_2$ and $T_3$ mounted thereon. The fixed hammer tool $T_1$ mounted on header slide H also appears in this figure. Shift arm 23 appears in elevation and the roller and cam 25 are clearly seen in Fig. 3. A spring 26a or other means may be provided to force the shift arm against its driving cam, and stops 27 may be provided for the arm. The details of the tool shifting mechanism form no part of this invention and reference is made to Patent No. 1,932,396 issued to W. L. Clouse on October 21, 1933, for another type of tool shifting mechanism which may be employed without departing from the spirit of this invention.

So that the header slide H may reciprocate and permit the tool shifting mechanism to operate, a pair of fixed cheek members 26 are provided to restrain the shifting arm 23 from axial motion while permitting it to have reciprocating motion. As best seen in Fig. 1, cheek members 26 may be integral with or attached to the frame, and member 22 merely slides through the arm 23 as the header slide reciprocates. Shaft 21 may be axially restrained in the header slide by any convenient arrangement of collars or other restraining means.

The principal details of the shearing mechanism are best seen in Fig. 4. What is needed is means to move the shear a proper distance relative to the dies at the proper time, and means to move the transfer mechanism clear of the forming die at the proper time. The die block B carries three dies: Die $D_1$ which receives the stock is behind the shear and is shown in dotted lines. The intermediate or transfer die $D_2$ is shown behind the solid shearing portion of the shear and it, too, is in dotted lines. The third or forming die $D_3$ is shown with the transfer fingers positioned in front thereof. The shearing mechanism includes a shear body 30 pivoted as at 30a to a pin supported by the frame. The shear is pivoted about 30a by the action of a pair of cams which drive the shear body through arms 31 and 32, and in the preferred embodiment these arms carry rollers 31a and 32a respectively. The shear is positively positioned at all times by the cams; cam 12 operates against roller 31a and cam 13 which is behind cam 12 operates against roller 32a, the relative axial position of the cams and rollers being clearly illustrated in Fig. 2.

Continuing the description of Fig. 4, at the upper end of the shear body 30 may be seen the shearing block 34 which may be integral with the shear body or solidly attached thereto. The action of this block will be explained presently.

Pivoted to the shear body is the transfer finger supporting arm 35, pivot 36 being provided for the purpose. A finger spacing extension 37 is formed on block 35 in order to mount the transfer fingers F, these fingers being retained by a bolt 39 and spring 40 in the preferred embodiment. Attached by any convenient means 41 to the arm 35 is a spring 42 which, in turn, may be fixed to the shear body 30. Spring 42 pulls the finger supporting arm 35 against a positioning pin 43 which pin may carry a roller 44 at its lower end. Roller 44 engages the transfer finger actuating cam 11 in order that the transfer finger may be lifted clear of the forming die at the proper time. A bracket 46 may be integral with or fixed to the frame U, this bracket having a pin guiding portion 47 and a feed stop arm 48, the action of which will be described in detail later in this description. The parts shown here, particularly the bracket 46, are simplified for purposes of explanation. In actual practice, and in accordance with accepted tool machine design practice, pin 43 would receive additional support adjacent cam 11. However, such obvious and conventional parts are omitted for clarity.

Fig. 5 is a section through the dies which shows the method of mounting a punch pin P in the shear block. Die $D_1$, which receives the stock, and where it is sheared, the transfer die $D_2$ and the forming die $D_3$ are partially shown in Fig. 5. Part of the shear body 30 is shown in sectional form and the shearing block 34 also appears sectioned, revealing the bore 49 which receives the stock when the shear block is positioned in front of die $D_1$. It is this block which shears off a blank (not shown) and presents it to die $D_2$ when the shear is moved to the position shown in Fig. 5. These operation will be referred to again in connection with the tracing through of a cycle. The punch pin P fits bore 49 and may be restrained therein by a pin and slot arrangement 51 and 52, these being merely one of many forms which could be employed for this purpose. The spring 50 serves to retract the pin to its outermost position when it is disengaged from the heading tool. Also in Fig. 5 can be seen feed stop 48 and a cam surface 48a which may be formed thereon to cam the pin behind the feed stock, when the shear moves to its stock receiving position.

Fig. 6 is an enlarged partial view of the transfer finger arrangement showing how the transfer fingers F are carried on their supporting arm 35. The spacing block 37 which may be integral with arm 35 is engaged by the fingers, and both the block and the fingers are apertured to receive a bolt 39 which carries a nut. Spring 40 causes both fingers to be resiliently urged against block 37. The fingers are formed with notched parts 53 so designed that a circle of the diameter X may be inscribed therein, and the notches 53 and the block 37 are so proportioned that the circle X is somewhat less than the diameter of the stock or blank to be engaged by the fingers so that a positive gripping action will be obtained. A relieved or beveled end portion 54 is provided on each finger so that, as will be described presently, if necessary the finger could snap over a piece of stock or blank when moved downwardly against the same. The fingers are beveled as at 53a to facilitate entry of the heading tool between the fingers.

Having completed the detailed description of the various parts of my improved double blow header, I shall now proceed to explain a series of diagrams which present in chronological order certain forming operations which take place during the machine cycle. As mentioned before, no attempt has been made to confuse the drawings by including machine design details which are well known to every mechanic, the basic elements are all shown in as simple a manner as possible, without sacrificing a clear disclosure of the manner in which my machine can be constructed.

In the description which follows, the formation of a finished article will be traced step by step in a series of drawings, each drawing including two parts. At the left of each figure is an elevation of the shearing mechanism, showing the position it assumes during the operation described; the header and tools being removed to give a view of the mechanism. At the right is a section taken through the dies, drawn in a simple schematic form with the tools and knockout arms indicated schematically.

In the view at the right, the shear is positioned so that the shearing block 34 has its aperture opposite that in die $D_1$ and the feed rollers have forced stock M so that a portion of the stock M lies in the aperture 49 in the shear block. This motion of the stock is stopped towards the end of the feeding cycle by the pin P, the head of which engages the feed stop arm 48. Customarily, the feeding mechanism is so designed that it slips slightly towards the end of its cycle, forcing the stock firmly against the pin. The dotted lines across the stock indicates the blank to be sheared off. As seen at the left, the cam and shear arrangement is such that not only is the shear positioned in front of the die $D_1$, but the fingers F are positioned in front of the die $D_2$, as will be explained presently. However, in this description the blank of stock $M_1$ will be traced through a complete cycle and for this reason the other parts and blanks shown in the figures will be ignored at this time.

Turning now to Fig. 8, in the view at the left it can be seen that the shear has started to move to the right in response to the cam action, bringing the block 34 towards die $D_2$. As seen at the right, the blank $O_1$ has been sheared off and is being carried towards aperture 57 in die $D_2$. Likewise, the header slide carrying tools $T_1$ and $T_2$ is approaching the die block, the tool shifting mechanism being timed so that heading tool $T_1$ is coming into position relative to forming die $D_3$.

Turning to Fig. 9, as seen at the left the cams are so designed that the shear block 34 is positioned in front of the die $D_2$ and the shear dwells in this position for the proper length of time. As seen at the right, the sheared blank $O_1$ has been positioned in front of the aperture 57 in die $D_2$ and the fixed tool $T_1$ has engaged the punch pin P and is in the process of forcing the sheared blank $O_1$ into the aperture 57 of the transfer die $D_2$.

In Fig. 10, which illustrates a portion of the cycle which takes place a short time after that previously shown in Fig. 9, the cam mechanism is positioned so that the shear body still dwells in its previous position. As seen at the right, the header slide continues its forward motion so that the pin P forces the blank completely into the transfer dies $D_2$ and against the knock-out pin $P_2$, the design of the parts being such that the blank is sized and given a regular shape whereby it becomes blank $O_2$.

In Fig. 11, as seen at the left, the cam arrangement which drives the shear body is such that now the shear is being retracted towards its left position. This portion of the cycle is likewise illustrated in the view at the right and the sized blank $O_2$ can be seen resting in the transfer die $D_2$.

In Fig. 12 the situation is similar to that shown in Fig. 11 except that the shear is a little farther along towards its left position. This figure is of no particular significance insofar as the blank $O_2$ is concerned and the reason for including it will become apparent as this description proceeds.

In Fig. 13 the shear is back at its left position, and as can be seen at the left the cam 11 which drives the shear actuating pin is such that the position of that pin relative to the under cam surface $35a$ on the finger supporting arm has caused the transfer fingers to come into rest with the notches therein aligned with transfer die $D_2$. This is also shown at the left where it can be seen that the sized blank $O_2$ is now in alignment with the fingers F. Of course, the shear block 34 is positioned in front of the stock receiving die $D_1$ as before, ready to receive a length of stock as previously described.

Returning to Fig. 7, it can be seen that the knock-out arm $K_1$ has been moved to its forward position by its operating cam, and acting through plunger 55 a knock-out pin $P_2$ has forced the sized blank $O_2$ into the fingers F which are positioned in front of the transfer die.

In Fig. 8, as seen at the left, the cams which drive the shear are moving the shear towards its right position. The under cam surface $35a$ on the finger supporting arm 35 is so designed that although the shear pin actuating cam 11 is at its low position the cam surface $35a$ slides across the upper end of pin 43 and causes the finger arm 35 to be quickly raised from the position it occupied in Fig. 7. This lifting action continues until at the portion of the cycle represented by Fig. 8, the lifting action of the entire arm caused by the pivoting of the shear arm overcomes the cam action off the under surface $35a$ and the shear arm starts to lower. The object of this arrangement is to move the sized blank $O_2$ towards the forming die $D_3$ in a relatively downward direction so that if anything remains caught in die $D_2$ it will merely enter the lower beveled portion of the fingers and they can spread against their spring 40 without damage. Of course, in the sectional view at the right of Fig. 8, since the fingers are raised clear of the die, they do not appear in the figure.

Turning now to Fig. 9 and examining the view at the left, it can be seen that the shear is positioned so that the transfer finger mechanism dwells in front of die $D_3$ with the sheared blank $O_2$ positioned in alignment with the aperture in that die. The cam arrangement which drives the shear body is designed to cause the shear body to dwell in this position for the proper length of time and likewise the cam which operates the shear pin has not yet raised the shear arm but permits it to assume the position shown. As seen at the right, the header slide has approached the die body and tool $T_2$ has just engaged and forced blank $O_2$ into the aperture 60 in die $D_3$ thereby catching the blank. Tool $T_2$, as seen in this figure, has an internal conical recess 58 and an external conical nose 59. The beveled edges $53a$ of the fingers permit the tool $T_2$ to engage the blank without damage to the fingers or tool. The parts shown in Fig. 9 just before the fingers are raised clear by the transfer arm actuating mechanism.

In Fig. 10, as seen at the left, the high part of cam 11 has snapped the fingers clear of the die $D_3$ so that the first forming operation can take place. As seen in the view at the right, heading tool $T_2$ has completed its first blow and has formed a conical head on the blank which now becomes blank $O_3$.

In Fig. 11 the shear is moving towards its left position, it being shown here at approximately half way between transfer die $D_2$ and the shearing die $D_1$. The blank $O_3$ can be seen in its die and the tool shifting mechanism described previously has been in operation so that the final forming tool T3 is swinging into position for the second blow. Tool T3 may contain a head forming recess 61, the shape of which is dictated by the article to be formed.

In Fig. 12 the completion of the second blow is illustrated. As seen to the left, the shear has almost reached its left position. In the view at the right it can be seen how the heading tool T3 has headed over the blank forming, in this case, the final blank in the shape of a rivet O4.

In Fig. 13 the header slide is retracting and the shear is again positioned at its extreme left position with the transfer fingers positioned in front of the transfer die and the shear block in front of the shear die ready for the feed and knock-out operation.

Fig. 7 completes the cycle, the rivet O4 being knocked-out, knock-out arm K2 acting through plunger 56 and knock-out pin P3. The operations taking place simultaneously at the shear die and transfer die have been explained previously.

Fig. 14 illustrates a modified mechanism for positioning the transfer fingers carried by the shear. In place of the pin 43 shown in Fig. 4, a link mechanism is provided in the modified form, this mechanism having some advantages such as those of rigidity and ruggedness. Bell crank member 70 has a roller 71 which engages the cam 11. The bell crank is pivoted on the fixed pivot as at 72 and is linked to a vertically extending connecting link 73. The roller 71 is kept against the cam by the spring rod 74 pivoted to the bell crank at 75 and surrounded by compression spring 76 mounted in any convenient manner. The upper end of the link 73 is pivoted at 77 to a finger actuating lever 78, this lever, in turn, being pivoted to the shear mechanism at 79 and terminating in an enlarged cam end 80. The finger carrying block 82 is recessed as at 81 to receive the end 80 of the finger actuating mechanism. This mechanism serves the same function as that previously described and the cam 11 is designed to have a contour which works with the modified finger mechanism to move the fingers in the position in front of the dies and to raise them clear of the dies at the proper time in the cycle as described in connection with the description of the other modification.

Having completed the detailed description of the basic machine elements required to provide my improved double blow header and having traced through a complete cycle of operation, it can be seen how I have provided a novel machine and have carried out the various objects referred to at the beginning of this description.

Those skilled in this art will readily appreciate the advantages of the solid die in the provisions of a sized and uniform sheared blank. My transfer die D2 is relatively lightly loaded and can be placed in between the conventional shear die D1 and the forming die D3, thereby halving the motion of the shear. This reduces wear and impact on the shearing mechanism and permits the formation of more accurate actuating cams in that there is less difference between their high and low parts.

Likewise, those skilled in the art will appreciate that due to the beveled and resilient mounting construction of my transfer fingers slight misalignment will not cause damage whereas in the conventional arrangement of this sort a part of the shearing mechanism might become inadvertently positioned in front of the forming tool. Furthermore, those skilled in the art will appreciate that my first forming tool can be made of a relatively heavy construction because in my design the relatively light beveled fingers can be quickly snapped clear after the blank is caught in the forming die.

It will be understood that the rivets which I have shown manufactured in my machine have only been illustrated in order that a clear disclosure of how the machine operates may be presented. Of course, the exact nature of the blank formed is a function of the shape of the dies, heading tools and knock-out pins. It would also be possible to extend the principles illustrated in this machine and provide a machine with more than one forming die by merely adding additional pairs of fingers to the finger supporting arm together with the proper header tools. The various mechanisms and machine elements which have been illustrated in order to build up an operative machine in this specification may be modified and their equivalents may be substituted without departing from the spirit of my invention. These and numerous other modifications will suggest themselves to mechanics skilled in the art to which this invention relates and it is to be understood that such modifications should not remove the device thus provided from the spirit of my invention as defined in the appended claims.

Having thus described the present invention so that others skilled in the art may be able to understand and practice the same, I state that what I desire to secure by Letters Patent is defined in what is claimed.

I claim:

1. In a metal working machine, a frame, a die block mounted in said frame having a stock feeding aperture, an intermediate die and a forming die, a header slide carrying a heading tool reciprocably mounted in said frame, driving means in said frame to reciprocate said header slide, a shearing mechanism mounted for reciprocation across said die block, means to drive said shearing mechanism in timed relation to said header slide drive, said shearing mechanism including a solid shear block having a blank receiving and shearing recess which is closed over more than 180° of arc, said block being driven to shear off a blank at said stock feeding aperture and to present said blank to said intermediate die, means carried by said header slide for forcing a sheared blank from said shear block into said intermediate die on a first forward stroke, said shearing mechanism drive means being timed to hold said shear block stationary in front of said intermediate die during completion of said first forward stroke and to retract the shear block toward said stock aperture during the following forward stroke, transfer mechanism moved by said shear mechanism for transferring a blank from the intermediate die to said forming die, means to move said transfer mechanism clear of said forming die while said shear block is held stationary at said intermediate die, and shiftable coning and heading tool means carried by said header slide and arranged to provide forming successive coning and heading operations on the same blank at said forming die with said transfer mechanism clear of said die.

2. In a metal working machine, a frame, a die block mounted in said frame having a stock feeding aperture, an intermediate die and a forming die, a header slide carrying a heading tool reciprocably mounted in said frame, driving means in said frame to reciprocate said header slide, a shearing mechanism mounted for reciprocation across said die block, means to drive said shearing mechanism in timed relation to said header slide drive, said shearing mechanism including a solid shear block having a blank receiving and shearing recess which is closed over more than 180° of arc, said block being driven to shear off a blank at said stock feeding aperture and to present said blank to said intermediate die, means carried by said header slide for forcing a sheared blank from said shear block into said intermediate die on a first forward stroke and thereafter sizing said sheared blank, said shearing mechanism drive means being timed to hold said shear block stationary in front of said intermediate die during completion of said first forward stroke, and to retract the shear block toward said stock aperture during the following forward stroke, transfer mechanism moved by said shear mechanism for transferring a blank from the intermediate die to said forming die, means to move said transfer mechanism clear of said forming die while said shear block is held stationary at said intermediate die, said header slide carrying shiftable tool means for performing two different successive forming operations on the same blank at said forming die with said transfer mechanism clear of said die, one of these successive operations being performed during said first stroke and the other during said following stroke.

3. In a metal working machine, a frame, a die block mounted in said frame having in substantial alignment a stock feeding aperture, an intermediate die and a forming die; a header slide carrying a heading tool reciprocably mounted in said frame, driving means in said frame to reciprocate said header slide, a shearing mechanism mounted for reciprocation across said dies, means to drive said shearing mechanism in timed relation to said header slide drive, said shearing mechanism including a solid shear block having a blank receiving and shearing recess which is closed over more than 180° of arc, said block being driven to shear off a blank at said stock feeding aperture and to present said blank to said intermediate die, means carried by said header slide for forcing a sheared blank from said shear block into said intermediate die on a first forward stroke, said shearing mechanism drive means being timed to hold said shear block stationary in front of said intermediate die during completion of said first forward stroke and to retract the shear block toward said stock aperture during the following forward stroke, transfer mechanism movably mounted on said shear mechanism for transferring a blank from the intermediate die to said forming die, said transfer mechanism being movable across the line of said dies, means to lift said transfer mechanism clear of said forming die while said shear block is held stationary at said intermediate die, said header slide carrying shiftable tool means for performing two different successive forming operations on the same blank at said forming die with said transfer mechanism clear of said die, one of these successive operations being performed during said first stroke and the other during said following stroke.

4. In a metal working machine, a frame, a die block mounted in said frame having a stock feeding aperture, an intermediate die and a forming die, a header slide carrying a heading tool reciprocably mounted in said frame, driving means in said frame to reciprocate said header slide, a shearing mechanism mounted for reciprocation across said die block, means to drive said shearing mechanism in timed relation to said header slide drive comprising a cam shaft rotatable in said frame and cam means on said shaft engaging said shearing mechanism, said shearing mechanism including a solid shear block having a blank receiving and shearing recess which is closed over more than 180° of arc, said block being driven to shear off a blank at said stock feeding aperture and to present said blank to said intermediate die, means carried by said header slide for forcing a sheared blank from said shear block into said intermediate die on a forward stroke, said shearing mechanism drive means being timed to hold said shear block stationary in front of said intermediate die during completion of said forward stroke, transfer mechanism mounted on said shear mechanism for transferring a blank from the intermediate die to said forming die, means to move said transfer mechanism across the line of motion thereof from die to die to clear said forming die while said shear block is held stationary at said intermediate die, said last named means comprising additional cam means on said cam shaft and cam follower means mounted on said frame adjacent said shearing mechanism, and tool means carried by said header slide and arranged to perform a forming operation at said forming die with said transfer mechanism clear of said die.

JOHN H. FRIEDMAN.

REFERENCES CITED

The following references are of record in the file of this patent:

UNITED STATES PATENTS

| Number | Name | Date |
|---|---|---|
| 1,619,494 | Wilcox | Mar. 1, 1927 |
| 1,929,865 | Burbank | Oct. 10, 1933 |
| 1,932,396 | Clouse | Oct. 31, 1933 |
| 1,994,242 | Clouse | Mar. 12, 1935 |
| 2,017,309 | Friedman | Oct. 15, 1935 |
| 2,020,658 | Frost | Nov. 12, 1935 |
| 2,026,823 | Clouse | Jan. 7, 1936 |
| 2,038,541 | Clouse | Apr. 28, 1936 |
| 2,043,093 | Clouse | June 2, 1936 |
| 2,069,511 | Wilcox | Feb. 2, 1937 |
| 2,093,646 | Purtell | Sept. 21, 1937 |
| 2,162,891 | Johnson | June 20, 1939 |
| 2,261,318 | Wilcox | Nov. 4, 1941 |
| 2,288,643 | Purtell | July 7, 1942 |